(12) United States Patent
Bauer-Nilsen

(10) Patent No.: US 6,354,394 B1
(45) Date of Patent: Mar. 12, 2002

(54) STEERING GEAR FOR PIVOTED WHEELS ON A VEHICLE

(76) Inventor: Magnus Bauer-Nilsen, Ginatunet 17, Haugesund (NO), N-5531

( * ) Notice: Subject to any disclaimer, the term of this patent is extended or adjusted under 35 U.S.C. 154(b) by 0 days.

(21) Appl. No.: 09/485,743

(22) PCT Filed: Aug. 27, 1998

(86) PCT No.: PCT/NO98/00257
§ 371 Date: May 5, 2000
§ 102(e) Date: May 5, 2000

(87) PCT Pub. No.: WO99/12794
PCT Pub. Date: Mar. 18, 1999

(30) Foreign Application Priority Data
Sep. 8, 1997 (NO) .................................. 974112

(51) Int. Cl.[7] .................................. B62D 5/06
(52) U.S. Cl. ................. 180/409; 180/408; 180/411; 280/771
(58) Field of Search .............. 280/771, 91.1; 180/408, 409, 411; 74/496; 474/141

(56) References Cited

U.S. PATENT DOCUMENTS

| | | | | |
|---|---|---|---|---|
| 239,432 A | * | 3/1881 | Bollee | 180/303 |
| 1,147,411 A | * | 7/1915 | Lansden, Jr. | 280/771 |
| 2,913,063 A | * | 11/1959 | Brown | 180/253 |
| 3,463,506 A | * | 8/1969 | Drake | 180/411 |
| 4,257,619 A | | 3/1981 | Fisher | |
| 4,335,626 A | * | 6/1982 | Fisher | 74/496 |
| 4,364,577 A | | 12/1982 | Tateyama et al. | |
| 4,950,126 A | * | 8/1990 | Fabiano et al. | 414/590 |
| 5,033,763 A | * | 7/1991 | Daenens et al. | 280/426 |
| 5,862,874 A | * | 1/1999 | Brienza et al. | 180/6.5 |
| 6,125,963 A | * | 10/2000 | Staiger | 180/411 |

FOREIGN PATENT DOCUMENTS

| | | |
|---|---|---|
| GB | 1155469 | 10/1966 |
| GB | 1222719 | 2/1971 |
| GB | 2116131 | 9/1983 |
| GB | 2155870 | 10/1985 |
| GB | 2 263 889 | 8/1993 |

* cited by examiner

Primary Examiner—Brian L. Johnson
Assistant Examiner—Deanna Draper
(74) Attorney, Agent, or Firm—Andrus, Sceales, Starke & Sawall, LLP

(57) ABSTRACT

A steering mechanism for steering angular deflections carried out on a vehicle's/carriage's pivoted steering travelling wheels (10a, 12a; 10b, 12b) positioned in a row at each side of the carriage (16). During turning, the mechanism allots to each of the pivoted, steerable travelling wheels (10a, 10b, 12a, 12b) a correct deflection differing from that of each of the other steerable wheels (parallelism may occur between pivoted, steerable wheels (10a, 10b, 12a, 12b) upon 90° turns). Each steerable wheel is assigned an upright shaft for turning around the axis thereof, the shaft carrying at least one non-circular motion-transferring disc (22a, 22b, 24a', 24b') which, according to the invention, have elliptical circumferential shape and have the form of chain wheels/belt pulleys, identical in pairs. The elliptical chain wheels/belt pulleys (22a, 22b, 24a', 24b') are motion-transferringly interconnected by endless drivable chains/belts (26, 28, 30).

26 Claims, 15 Drawing Sheets

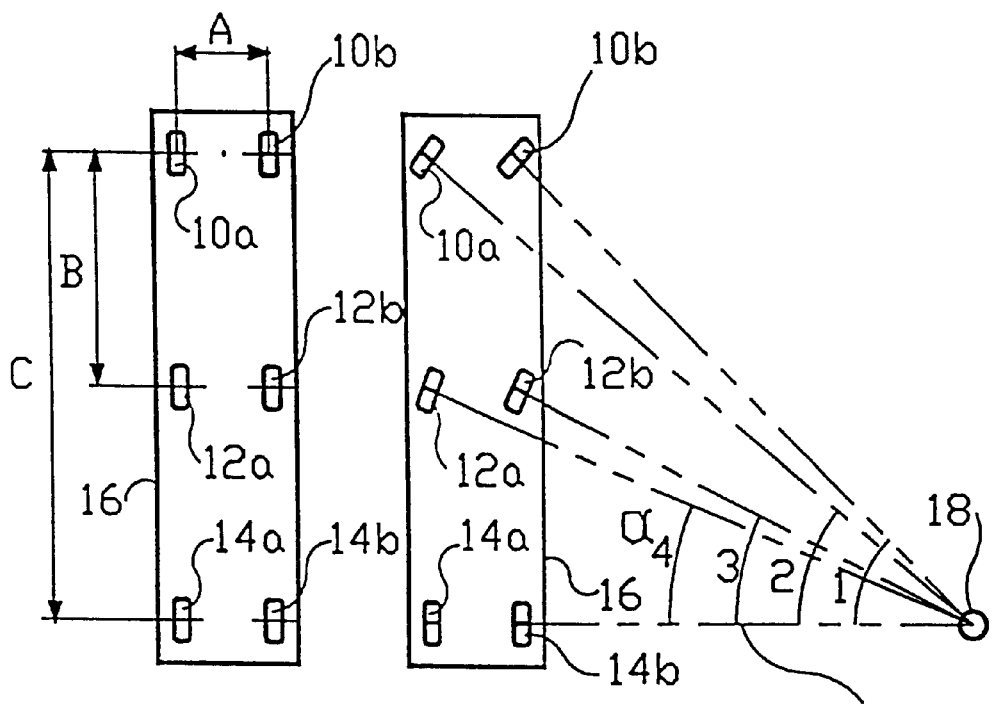
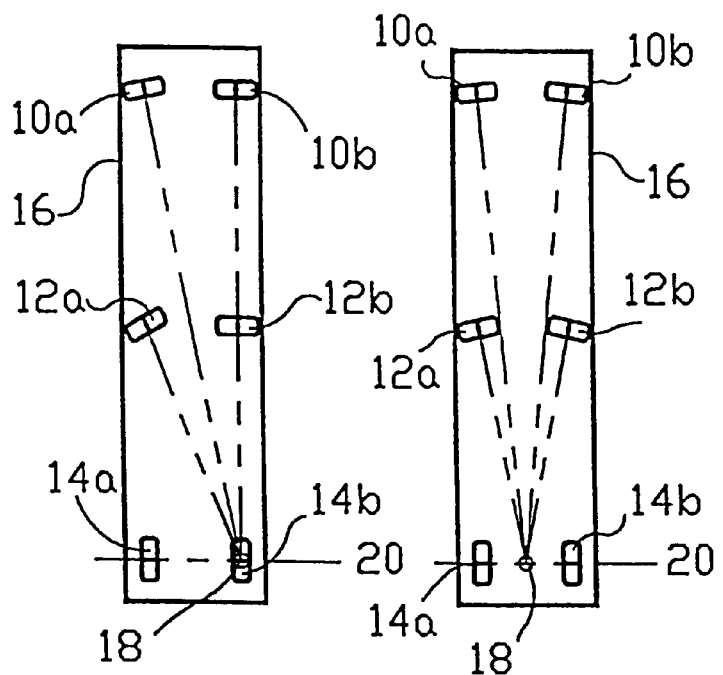
FIG. 1  FIG. 2
FIG. 3  FIG. 3A

STEERING GEAR FOR PIVOTED WHEELS ON A VEHICLE

BACKGROUND OF THE INVENTION

The present invention relates to a steering gear for pivotal wheels on a vehicle or carriage, wherein the steering gear is adapted to steer the pivotal wheels so that the centre lines in the rotational axes for the pivotal and possible non-pivotal wheels meet in a common point which is the pivot point of the carriage, and wherein the vertical pivot axle of each of the pivotal wheels is provided with at least one chain wheel or belt pulley, each of said chain wheels/belt pulleys being connected with a chain wheel/belt pulley assigned to the pivot axle of another laterally positioned pivotal wheel by means of a chain or a belt, so that the pivot angle swing is transferred between the pivotal wheels.

The vehicle or the carriage, respectively, comprises in each single case a set of travelling wheels including at least two, preferably four or more, pivotal, steerable travelling wheels.

The steering gear is intended used on a vehicle/carriage having a plurality of steerable wheels, for the conveyance of long, heavy objects, such as loaded 40 feet containers. When driving on small quay and dock plants as well as within buildings, it is necessary that the carriage has several steerable wheels with a minimum pivot radius (90° to either side).

In a set of travelling wheels of a vehicle/carriage comprising in all six travelling wheels: two steerable front wheels, two steerable intermediate wheels and two non-steerable rear wheels, the mutually differing angular deflections of the individual travelling wheels upon turning of the vehicle may be illustrated as follows: The fixed rotational axis of the rear wheels is extended imaginarily, and an imaginary line is drawn from the rotational axis of one of the steerable wheels (e.g. the right hand front wheel) until it crosses the rotational axis extension of the rear wheels. Thus, a crossing point is created, the location thereof on said rotational axis extension is dependent on the radius of the turn; the more sudden turn, the closer to the rear wheels is the crossing point situated. This crossing point constitutes the turning centre of all pivotable, steerable wheels, and this pre-supposes, of course, that all four steerable travelling wheels in the present exemplary embodiment each exhibits an angular deflection differing from the angular deflection of each of the remaining three travelling wheels.

The angle between an imaginary line parallel to the rotational axis of the rear wheels and the rotational axis of the various steerable wheels will differ from wheel to wheel in any turning position of the vehicle/carriage. (In one case, said angles were: right hand front wheel: $\alpha_1 26\ 75°$; left hand front wheel: $\alpha_2 \approx 67°$; right hand intermediate wheel: $\alpha_3 \approx 60°$; left hand intermediate wheel: $\alpha_4 \approx 53°$)

When following the road ahead, all angles $\alpha_1 - \alpha_4$ are each equal to 90° (the wheels are parallel).

The above-mentioned case where the turning radius through the mid point of respective wheels of all pivotable, steerable travelling wheels passes through a common point, represents the ideal case.

In order to secure correct angular deflection at each single pivotable, steerable wheel upon turning of the vehicle/carriage, the steering angles ($\alpha$) are synchronised by means of a steering gear always securing correct angle of the wheel axes in relation to the rolling direction of the wheels.

Correct angular deflection/steering angle for all pivotable, steerable travelling wheels is characterized in that all centre lines for the wheel rotation have said common crossing point or are parallel (upon driving ahead/reversing).

Today, on loading and passenger vehicles, a synchronising mechanism comprising steering-gear levers and lateral struts is used for synchronising the turning movements of the steerable travelling wheels. A disadvantage of this prior art synchronising mechanism is that the inaccuracy adjacent maximum angular deflections is all too large.

Moreover, it does not allow full swing-out of the steering wheels. Thus, said swing-out will never approach 90° to either side. For vehicles and carriages having a need for approximately 90° turning possibility to either side, e.g. the above-mentioned construction where the set of travelling wheels comprises two steerable front wheels, two or more steerable intermediate wheels, as well as two rear wheels having a fixed rotational axis, this known synchronising mechanism is less fit.

In a vehicle having a 90° turning possibility to either side, the pivotable, steerable wheels must be driven; preferably hydraulic or electric operation. This has become more and more usual, e.g. in special vehicles within agriculture and industry.

Moreover, prior art comprises in the field concerned, e.g. those mechanisms disclosed in Swedish Laying-Out publication No. 343,254, British patent specification No. 1,155, 469 as well as British patent applications Nos. 2,116,131 and 2,155,870.

The Swedish Laying-out publication No. 343,254 deals with a steering gear which is intended to be used on steerable portal cranes. Here, the steering movement is transferred to the wheels from a rack through a toothed segment. The racks are displaced by means of cam grooves (called slideways). The shape of the cam grooves (the slideways) is configurated such that the racks, through the toothed segments, allot to the guide wheels differing steering angles in relation to the driving direction of the vehicle. The critical point of this known steering gear is the shape of the two cam grooves (the slideways). The shape of cam grooves cannot be calculated mathematically, and must be adapted by tests. This known steering gear is likely to be too inaccurate, especially in connection with large turning angles, e.g. up to 90° deflection to either side. The steering mechanism has many mechanical parts which will probably be difficult and expensive to produce.

Moreover, the mechanism would not be usable in connection with two or more steerable intermediate wheels.

British patent specification No. 1,155,469 deals with a camera carriage which, in one embodiment, has four pair of wheels each allotted a vertical shaft for turning around the axis thereof in the horizontal plane. On each of the various vertical shafts, a chain wheel is mounted, two chain wheels being interconnected with an outer, driven chain wheel through a first chain, while the two chain wheels are interconnected with another chain which, through guides, likewise engages said outer, driven chain wheel.

In this known transmission mechanism, each chain wheel is circular, and it is, therefore, unfit for use in a set of wheels wherein the steerable wheels have to be allotted mutually differing angular deflections upon turning of the vehicle/carriage. With the known transmission mechanism, each wheel's angular deflection would be equal to the remaining deflections. Therefore, upon turning it will arise lateral sliding between the wheels.

British patent application No. 2,116,131 deals with a steerable platform for a lawn mower. In this known device, the vertical shaft of each wheel is provided with pulley. The pulleys are motion-transmittingly interconnected by means of a belt driven by means of an outer, driven pulley. The pulleys have the same size and will, thus, not be usable for a is set of wheels comprising two steerable front wheels and at least one steerable intermediate wheel, spaced from the front wheels in the longitudinal direction of the vehicle and, possibly, a pair of rear wheels without turnability.

British patent application No. 2,155,870 which is intended to be used for fork truck or harvesting vehicle for agricultural purposes, deals with two different mechanisms for the provision of differing rotational movement for two wheels of a pair, each wheel's vertical shaft being provided with a noncircular, rounded body which is comma-shaped or consists of two rounded bodies consisting of upright cones, the one with the smallest base lowermost, and the other in an opposite position. Both the comma mechanism and the cone mechanism are motion transmittingly connected by means of an endless, flexible rope. When a first wheel's vertical shaft is rotated for turning the vehicle, the flexible rope attends to rotate the other wheel's vertical shaft, the rotational angle of the latter shaft and, thus, of the wheel belonging thereto will differ from the rotational angle (angular deflection) of the first wheel.

On each of the comma-sign-shaped "rope sheaves", the ends must be bent up or down in order to prevent that these ends in an outer position touch the transfer belts. On the cone-shaped casters, helical grooves (coarse threads) have been made, said grooves upon turning (rotation) guide the transfer belts up or down along the cones and, thus, changes the diameter of the grooves.

Thus, British patent application GB No. 2,155,870 discloses two embodiments which theoretically will give two interconnected guide wheels a non-uniform guide angle when the carriage turns. It is less likely that practically usable calculation formulae can be developed, capable of defining dimensional criterions for the shape of the comma as well as the upward and downward bending of the ends of the comma. (Calculation formulae based on wheel spacings, wheel angles and distance to common turning point for all wheels on the carriage).

Calculation formulae for the shape of the cone as well as the thread pitch of the helically shaped grooves, should probably be easier to develop than for the shape of the comma, but the large building height of the cones is limiting for the practical use.

Comma-shaped or cone-shaped transfer means would hardly (due to inaccuracy and space considerations) be usable on a long vehicle for heavy transport, for steering a number (two rows) of steerable intermediate wheels, as the task is for the present invention.

SUMMARY OF THE INVENTION

Thus, the invention is occupied with a steering gear for steering angular deflections of the pivotable, steerable travelling wheels of a vehicle/carriage upon turning so that correct mutually differing deflections are secured on the individual steerable wheels, wherein the vehicle/carriage comprises a set of travelling wheels including at least two, preferably four or more pivotable, steerable travelling wheels, inclusive of a pair of front wheels, and wherein each of the vertical shafts assigned to the front wheels carries at least one non-circular, rounded means, said means which are identical, are motion transmittingly interconnected by means of a movable endless means passed around the non-circular means which, upon turning, allot the two front wheels different angular deflections. Upon turning, one wheel's vertical shaft is influenced by turning, or the influence may take place by attacking on the endless transmission means.

According to the invention, a steering gear of the kind as defined in the last section is characterized in that interconnected chain wheels/belt pulleys which in general is to be given different angular deflections upon turning, are shaped as ellipses, the major axes thereof being disposed in a certain mutual angle when the wheel axes are parallel, i.e. that the vehicle/carriage is driven straight ahead or backwards. To the same vertical steering shafts, a non-circular means has been mounted, said means, at either side of the carriage, each is assigned an identical non-circular means on the vertical turning shafts for the steerable intermediate wheels.

The non-circular means of said intermediate wheels is by means of a second or a second and a third, respectively, endless chain/(toothed) belt, motion transferringly interconnected with identical non-circular means of steering wheels (front wheels/intermediate wheels) situated in front thereof (elliptical chain wheels or belt pulleys, preferably toothed belt pulleys, respectively, of front wheels or intermediate wheels situated in front thereof, respectively).

Such a steering gear comprising transmission devices where elliptical chain wheels/toothed belt pulleys are disposed on the vertical shafts assigned to the respective pivotable, steerable travelling wheels, enables the turning of each wheel about an individual vertical rotational axis, said pivotable, steerable wheels being interconnected in pairs by means of endless chain/toothed belt (the two front wheels being interconnected as known per se; one of the front wheels and one or more intermediate wheels being interconnected at the same side of the vehicle/carriage, each front wheel and an intermediate wheel or more on the opposite side of the side where the associated front wheel is placed, respectively).

Typically, the set of travelling wheels comprises in all six wheels, a pair of pivotable, steerable front wheels, a pair of pivotable, steerable intermediate wheels and a pair of rear wheels having a fixed rotational axis. Each of the two front wheels is assigned a vertical shaft to which is mounted elliptical chain wheels/(toothed) belt pulleys. First non-circular transmission means belonging to the front wheels and positioned at the same level, are interconnected by means of a first endless chain/(toothed) belt. Moreover, left hand front wheel's second elliptical chain wheel/(toothed) belt pulley, at another level, is connected to left hand intermediate wheel's elliptical chain wheel/(toothed) belt pulley by means of a second endless chain/(toothed) belt. Right hand front wheel's second elliptical chain wheel/(toothed) belt pulley is connected with right hand intermediate wheel's elliptical chain wheel/(toothed) belt pulley, both of which are situated at the same level as the elliptical chain wheels/belt pulleys of left hand front wheel and left hand intermediate wheel.

A steering gear which, according to the invention, comprises transmission devices based on elliptical chain wheels/(toothed) belt pulleys assigned to a plurality of pivotable, steerable wheels at either side of the carriage (having one or more elliptical chain wheels/(toothed) belt pulleys mounted on the respective vertical rotational shafts, connected in pairs by means of endless chains/(toothed) belts), has be found to give more accurate angular deflections for the pivotable wheels than achievable by means of prior art technique, especially upon sudden turns (45–90°) where steering gears shaped and designed in accordance with prior art would be quite inadequate.

Therefore, it has been a specific object of the present invention to provide a precision steering gear for vehicles/ carriages constructed with a view to make 90° turns. Upon such a sudden turn, the common intersection point of the turning radii of the steerable wheels on a fixed rear wheel axis (extension) will, with a set of travelling wheels comprising e.g. six wheels, be positioned on that rear wheel's central point in vertical projection situated at that side towards which one is turning. Thus, if one turns 90° to the right, said intersection point will be positioned on the vertical central line of right hand rear wheel, and right hand front wheel's central vertical plane will form 90° with a vertical plane through the vertical central lines of right hand rear wheel and right hand front wheel. Right hand intermediate wheel's vertical central plane takes the same orientation as right hand front wheel, while the central vertical planes of left hand front wheel and left hand intermediate wheel form angles with the vertical plane through the vertical central line of right hand front wheel and rear wheel differing from 90°; and from each other (because their turning radii form an acute angle with each other, corresponding to general symmetry requirements in order to enable a 90° turn to both sides).

Also, the invention would be usable on vehicles having steerable front wheels and rear wheels guided simultaneously, as well as on vehicles having four or more steerable intermediate wheels. Then, the line for a common point of intersection for the turning centres of all wheels is an imaginary line through the central point of the carriage. (This line may also be centre line for fixed, non-steerable wheels in the middle of the carriage).

Thus, a steering gear according to the invention represents a technical progress within the field concerned, especially in vehicles/carriages the set of wheels thereof allowing 90° turns to both sides.

If the distance between the rotational axes of the front wheels and the rear wheels, upon driving straight ahead or rearwardly, respectively, is denoted C, and the corresponding distance between front wheels and intermediate wheels is denoted B, the proportion C/B will—in order to secure correct angular deflections for the individual guiding wheels—require elliptical chain wheels/toothed belt pulleys wherein the ellipsis has a certain eccentricity or proportion (Dm/dm), respectively, between the major axis (Dm) and the small axis (dm) for the respective ellipsis. It is quite simple to construct chain wheels/toothed belt pulleys each having an elliptic efficient circumference and varying ellipsis eccentricity respectively varying the proportion Dm/dm for adoption to various proportions of C/B.

DESCRIPTION OF THE SEVERAL VIEWS OF THE DRAWING

Non-restricting, illustrative examples of possible embodiments are further explained in the following, reference being made to the attached diagrammatical drawings, in which:

FIG. 1 shows in plan view a set of travelling wheels comprising six wheels, arranged in pairs, two front wheels in a forward position in relation to a vehicle/carriage, only indicated by an outline surrounding the wheels; two intermediate wheels in an intermediate position and two rear wheels in a rear position;

FIG. 2 corresponds to FIG. 1, showing the mutually differing angular deflections allotted to the various pivotable, steerable wheels (front wheels and intermediate wheels) when the vehicle/carriage turns 45° to the right;

FIG. 3 corresponds to FIGS. 1 and 2, showing however the pivotable, steerable wheels in the turning positions they take when the vehicle/carriage turns 90° to the right;

FIG. 3a corresponds to FIGS. 1, 2 and 3, showing however the pivotable, steerable wheels in the turning positions they take when the vehicle/carriage turns around the turning centre (18) halfway between the rear wheels (14a and 14b);

DETAILED DESCRIPTION OF THE INVENTION

Figure 4:
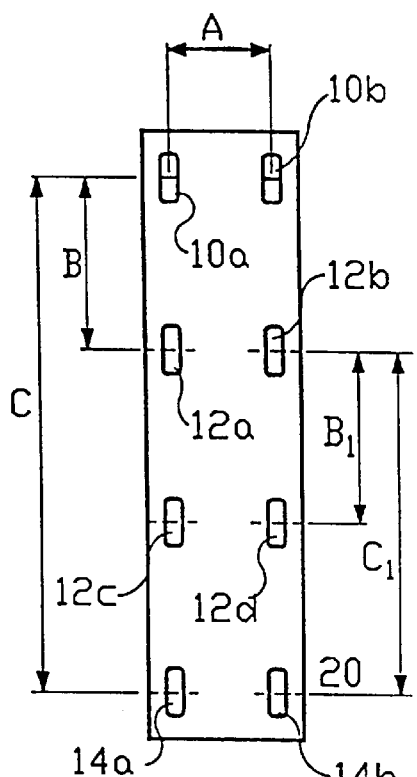
FIG. 4 shows, in a plan view, a set of travelling wheels comprising eight wheels, grouped in pairs: two front wheels in a foremost position in relation to a vehicle/carriage only indicated as an outline around the wheels; four intermediate wheels in an intermediate position as well as two rear wheels in a rearmost position.

First, reference is made to FIGS. 1–3, where a pair of pivotable, steerable front wheels are denoted at 10a, 10b, a pair of pivotable, steerable intermediate wheels at 12a, 12b and a pair of non-pivotable rear wheels at 14a, 14b. A vehicle/carriage is indicated by means of an outline 16 surrounding the set of travelling wheels 10a, 10b, 12a, 12b, 14a, 14b.

FIG. 1 shows the steerable wheels 10a, 10b, 12a, 12b in the parallel positions they take upon driving straight ahead/rearwardly, FIG. 2 showing the steerable wheels in the mutually differing inclined positions they take when the vehicle/carriage makes a 45° turn to the right. A common turning point 18 for the four steerable wheels is positioned on a continuation 20 of the rotational axis of the rear wheels. A 90° turn to the right, in which the turning takes place around the central point of the right rear wheel 14b as common turning point, is shown in FIG. 3. FIGS. 2, 3 and 3b show ideal cases, in which the respective turning radii of the pivotable wheels 10a, 10b, 12a, 12b meet in a common point.

Figure 5:
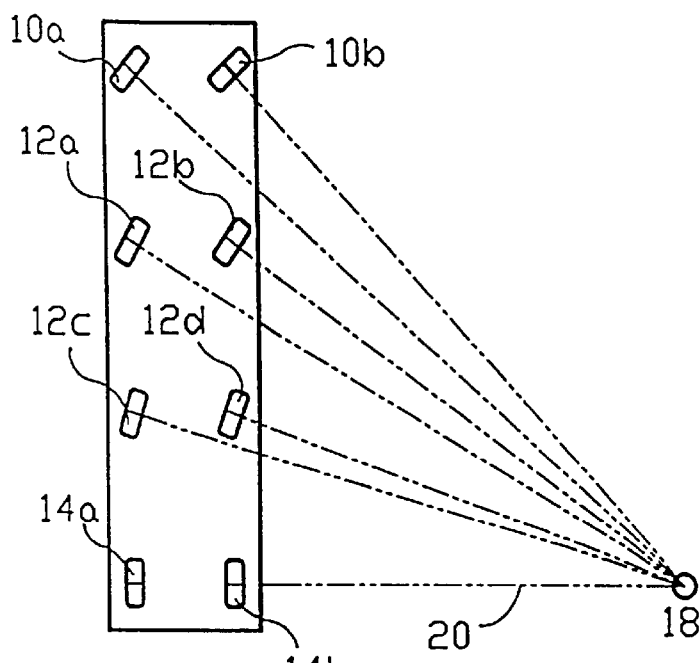
FIG. 5 corresponds to FIG. 4, but shows the mutually differing angular deflections allotted to the various pivotable, steerable wheels (the front wheels and the intermediate wheels) when the vehicle/carriage is turned 45° to the right.
Figure 6:
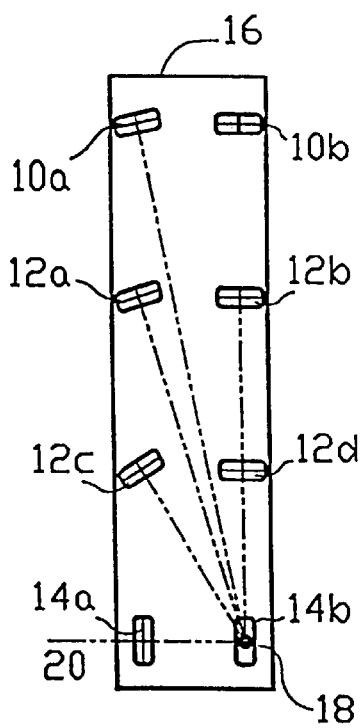
FIG. 6 corresponds to FIGS. 4 and 5, but shows the pivotable, steerable wheels in the turning positions they take when the vehicle/carriage is turned 90° to the right.
Figure 6A:
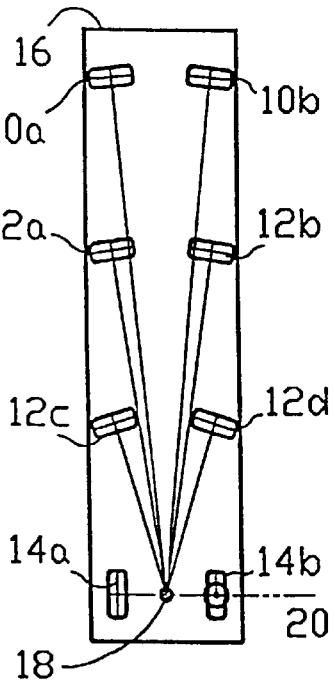
FIG. 6a corresponds to FIGS. 4, 5 and 6, but shows the pivotable, steerable wheels in the turning positions they take when the vehicle/carriage turns with the turning point (18) halfway between the rear wheels (14a and 14b)

FIG. 4 shows the steerable wheels 10a, 10b, 12a, 12b, 12c, 12d in the parallel positions they take upon driving straight ahead/rearwardly, FIG. 5 showing the steerable wheels in the mutually differing inclined positions they take when the vehicle/carriage makes a 45° turn to the right. Common turning point 18 for the six steerable wheels is positioned on a continuation 20 of the rotational axis of the rear wheels. A 90° turn to the right in which the turning takes place around the central point of the right rear wheel 14b as common turning point, is shown in FIG. 6. FIGS. 5, 6 and 6b show ideal cases, where the respective turning radii of the pivotable wheels 10a, 10b, 12a, 12b, 12c, 12d meet in a common point.

Figure 7:
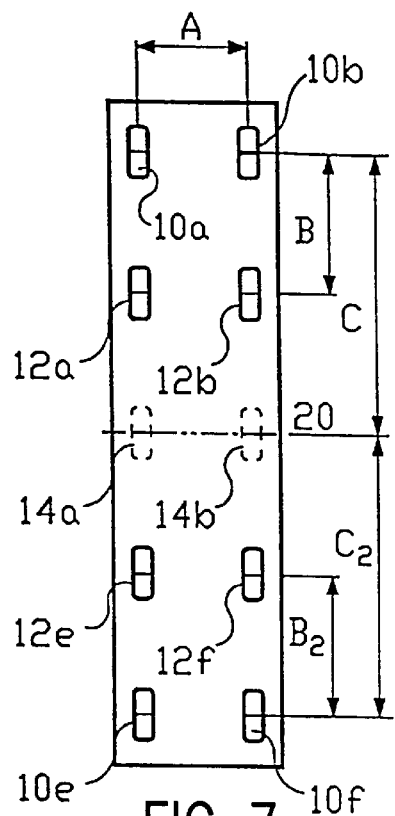
FIG. 7 shows, in a plan view, A set of wheels comprising eight wheels grouped in pairs: two front wheels in a foremost position in relation to a vehicle/carriage only indicated through an outline around the wheels, two intermediate wheels closest to the steer wheels and two intermediate wheels closest to the two steerable rear wheels. On the line for the turning centres for all steerable wheels two fixed wheels are indicated.
Figure 8:
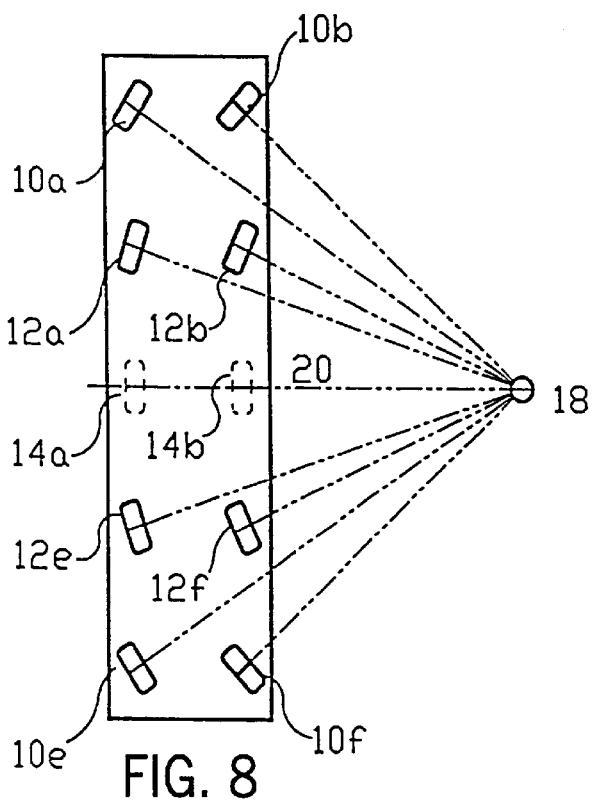
FIG. 8 corresponds to FIG. 7, but shows the mutually differing angular deflections allotted to the steerable wheels when the vehicle/carriage is turned 45° to the right.
Figure 9:
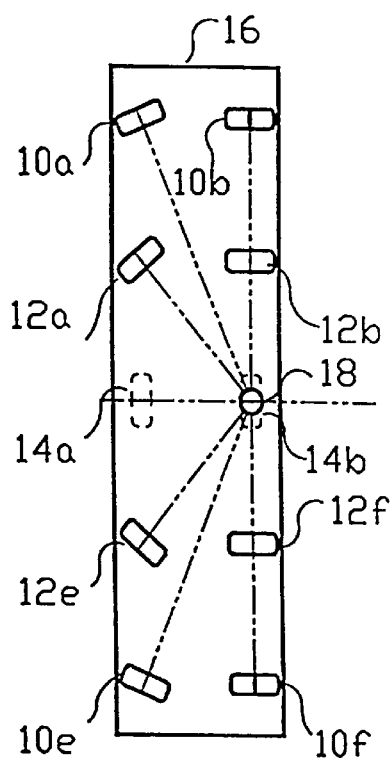
FIG. 9 corresponds to FIGS. 7 and 8, but shows the pivotable, steerable wheels in the turning positions they take when the vehicle turns 90° to the right.
Figure 9A:
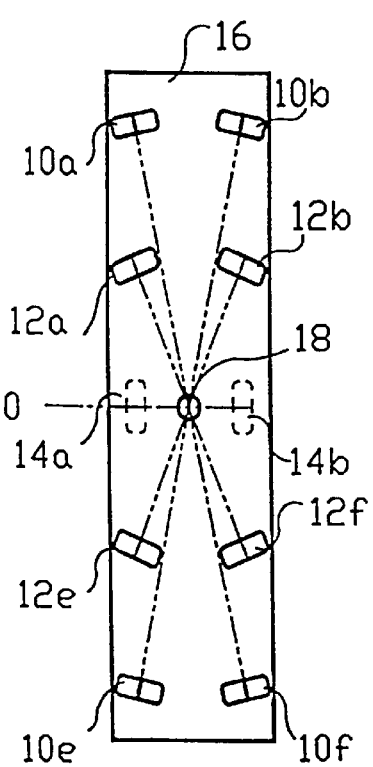
FIG. 9a corresponds to FIGS. 7, 8 and 9, but shows the pivotable, steerable wheels in the turning positions they take when the vehicle turns with a turning point (18) in the middle of the vehicle/carriage.

FIG. 7 shows a carriage having ten wheels, of which eight are steerable wheels 10a, 10b, 12a, 12b and 10e, 10f, 12e, 12f which, with parallel wheels, drive straight ahead/rearwardly. FIG. 8 shows the steerable wheels in mutually differing inclined positions when the carriage makes a 45° turn to the right. Common turning point 18 for the eight steerable wheels is positioned on an extension 20 in the middle of the carriage. Fixed wheels 14a and 14b may be placed, the rotational axis thereof being in the extension line 20. Upon a turn of 90° to the right, the turning takes place around the centre 18 positioned in the centre of the wheel 14b in the middle of the carriage; this is shown in FIG. 9. In FIGS. 8, 9 and 9a, all wheels turning about a common centre 18 have been shown.

Figure 10:
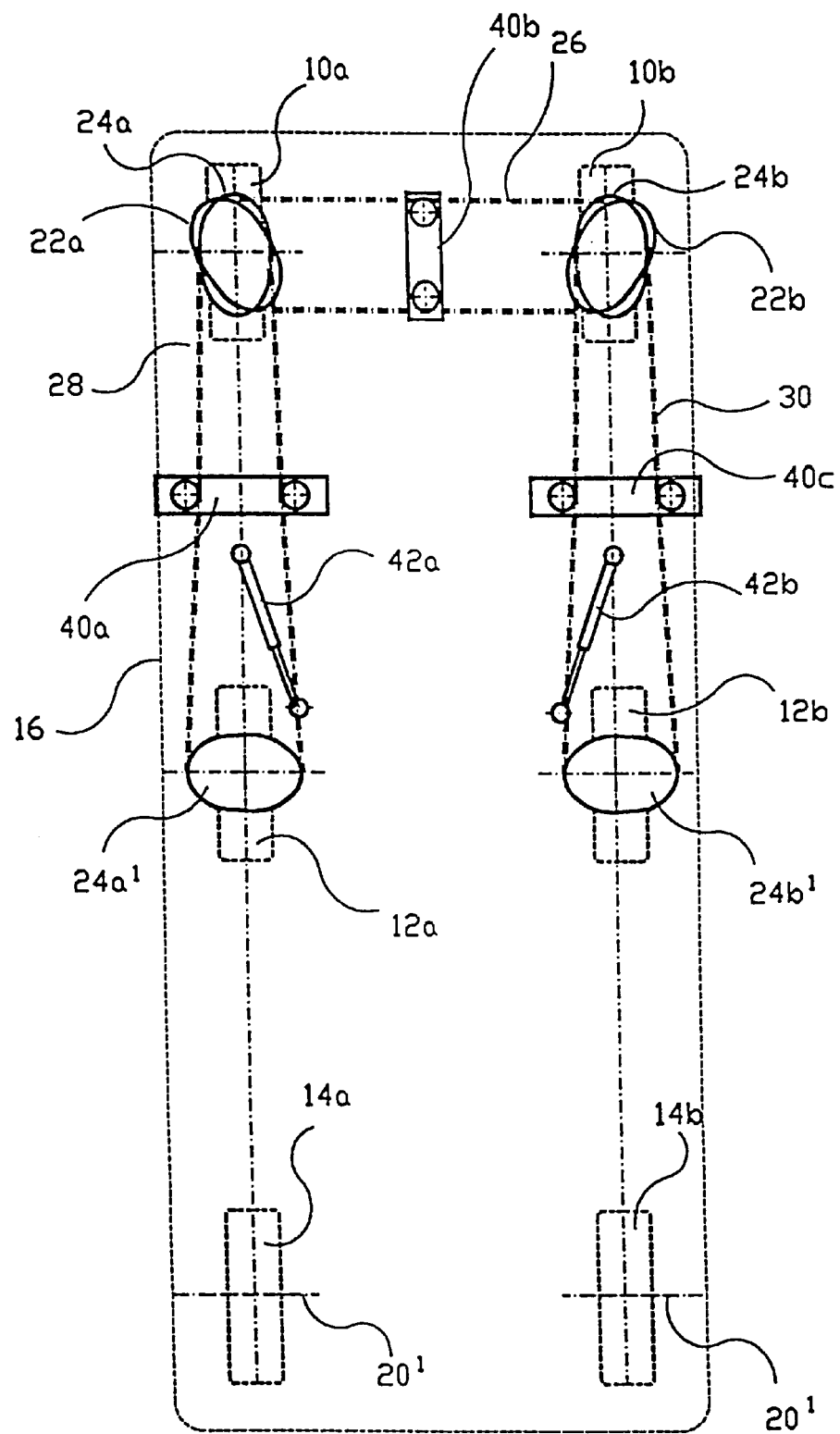
FIG. 10 shows a plan view of the vehicle wherein the set of travelling wheels comprises totally six wheels, of which four are pivotable, steerable wheels, each pivotable wheel being equipped with at least one elliptical chain wheel/belt pulley assigned to the vertical shaft of the respective wheel, around the axis of said shaft the wheel may turn.

In FIG. 10, a set of travelling wheels comprises six wheels grouped in pairs, two steerable front wheels 10a, 10b, two steerable intermediate wheels 12a, 12b and two rear wheels 14a, 14b having a fixed rotational axis 20'. As shown, each of the two front wheels 10a, 10b is assigned two elliptical chain wheels/belt pulleys 22a, 24a, 22b, 24b. Here, the chains 28 and 30 between front wheel chain wheels/belt pulleys and associated intermediate wheel chain wheel/belt pulley are approximately parallel to each other. For each of the three motion-transferring chains/belts 26, 28, 30, an automatic stretching or tensioning device 40a, 40b and 40c, respectively, has been disposed; a further account of these will be given later in association with FIGS. 21 and 22.

However, in FIG. 10 an activator has been drawn in the form of a pressurised fluid operated piston cylinder 42a, 42b (hydraulic control cylinder) for each of the chains/belts 28 and 30, respectively. Displacement of the chains (or one of them) causes synchronised turning of the individual elliptical chain wheels/belt pulleys 24a and 24a' as well as 25b and 24b' transferring the turning to 22a and 22b and the chain/belt 26.

Figure 11:
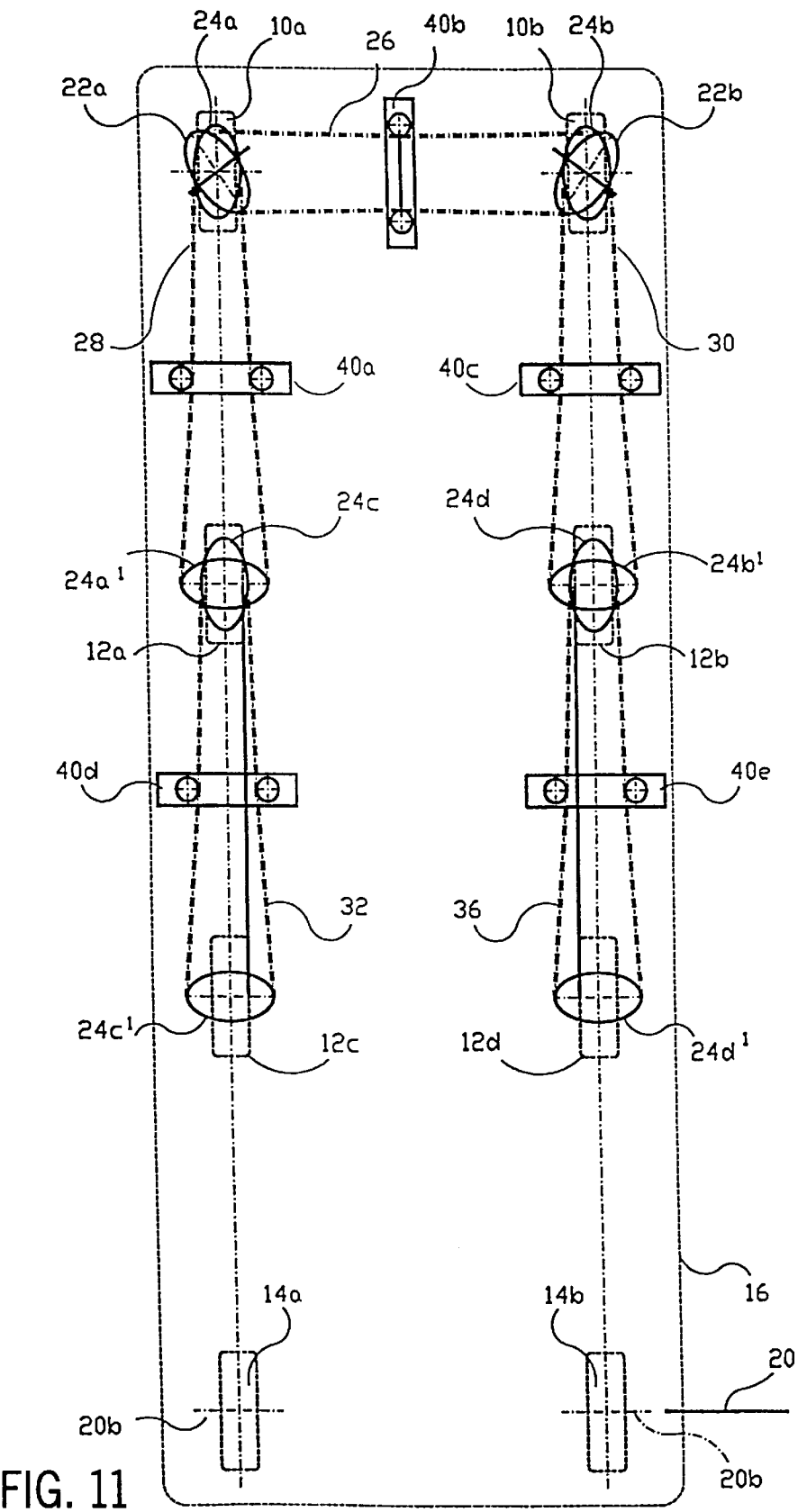
FIG. 11 shows a plan view of the vehicle wherein the set of travelling wheels comprises totally eight wheels, of which six are pivotable, steerable wheels, each pivotable wheel being provided with at least one elliptical chain wheel/belt pulley assigned to the vertical shaft of the respective wheel, around the axis of said shaft the wheel may turn.

In FIG. 11, a set of travelling wheels comprises eight wheels grouped in pairs: two steerable front wheels 10a and 10b, four steerable intermediate wheels 12a, 12b, 12c, 12d as well as two rear wheels 14a and 14b having a fixed rotational axis 20b. As shown, each of the two front wheels 10a and 10b as well as each of two intermediate wheels 12a and 12b are assigned two elliptical chain wheels/belt pulleys 22a, 24a–22b, 24b and 24a', 24c–24b', 24d.

The chain 26 interconnects the two steerable front wheels. The chains 28 and 30 interconnect steerable front wheels and intermediate wheels. The chains 32 and 36 interconnects the two pairs of intermediate wheels. For each of the five motion-transferring chains/belts 26, 28, 30, 32 and 36, an automatic stretching device 40*a,* 40*b,* 40*c,* 40*d* and 40*e* is arranged. A further account of the latter will be given later in association with FIGS. 21 and 22.

Figure 12:
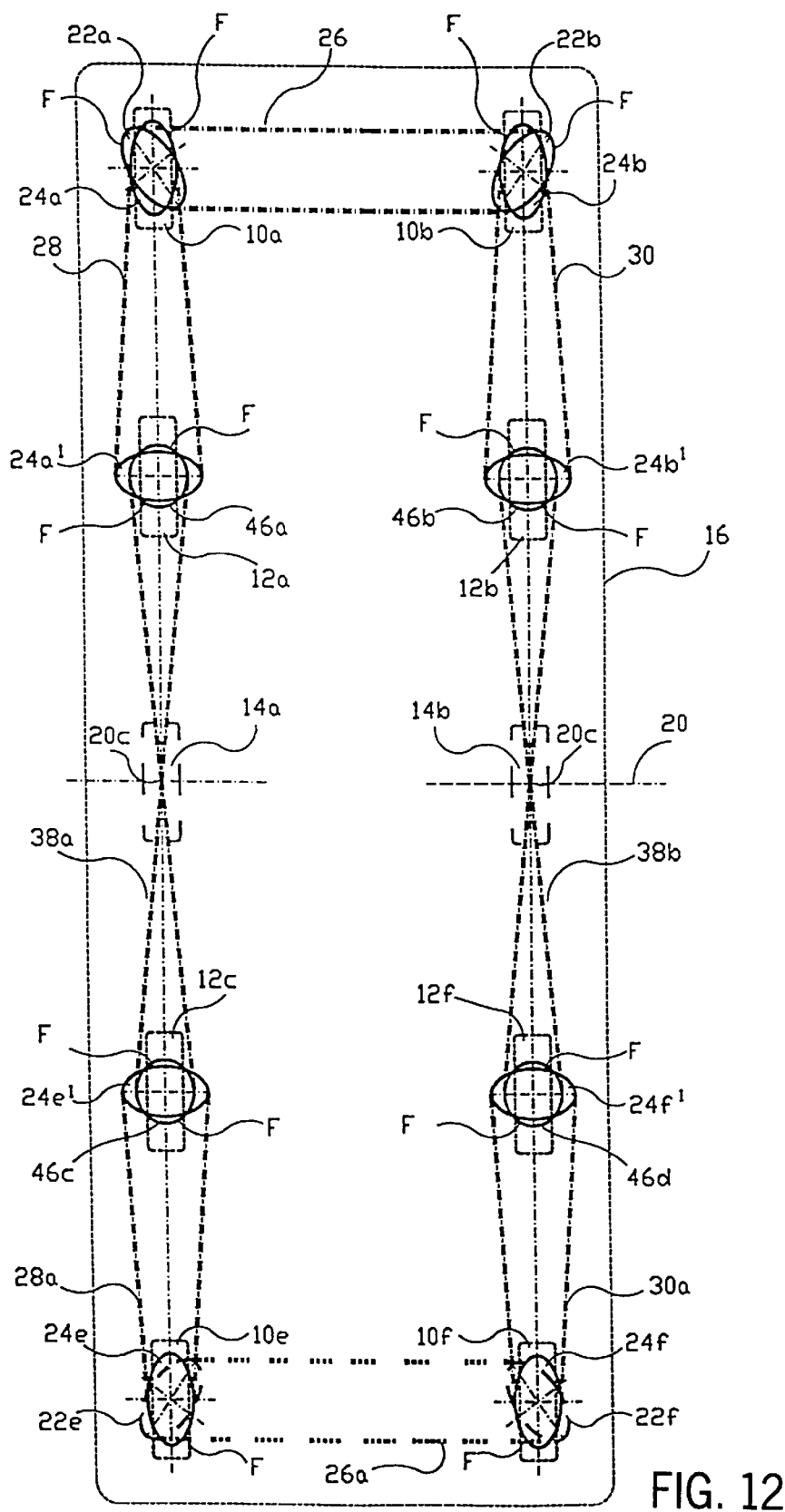
FIG. 12 shows a plan view of the vehicle wherein the set of travelling wheels comprises totally ten wheels, of which eight are steerable, each pivotable wheel being provided with at least one elliptical chain wheel/belt pulley assigned to the vertical shaft of the respective wheel, around the axis of said shaft the wheel may turn. Circular turning/reversing wheels simultaneously acting guidingly on front wheels and rear wheels.
Figure 13:
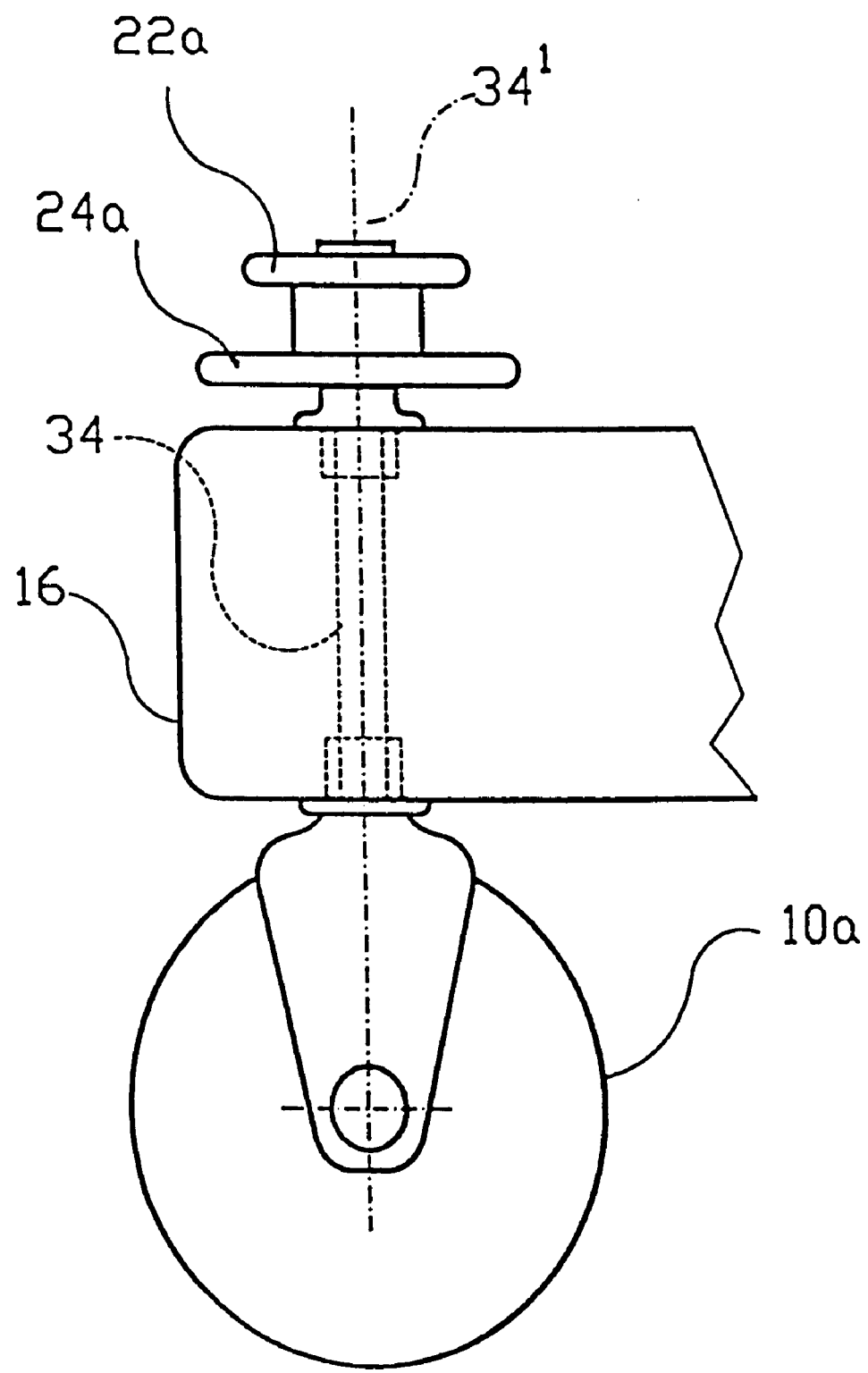
FIG. 13 is a partial view as seen laterally of a steer/guide wheel having a vertical shaft assigned thereto and carrying two elliptical chain wheels/belt pulleys, said steer/guide wheel—in relation to FIG. 10—is a front wheel.

In FIG. 12, a set of travelling wheels comprises eight wheels grouped in pairs, two steerable front wheels 10*a* and 10*b* and two steerable rear wheels 10*e* and 10*f*, as well as four steerable intermediate wheels 12*a,* 12*b,* 12*c* and 12*f*. To each of the vertical turning shafts of all wheels is coupled at least one elliptical chain wheel/belt pulley. The intermediate wheels are also coupled to a circular chain wheel/belt pulley (46). The chain 26 interconnects the two steerable front wheels, and the chains 28 and 30 interconnect steerable front wheels and intermediate wheels. The chains 28*a* and 30*a* interconnect the two steerable rear wheels with the adjacent intermediate wheels.

Figure 14:
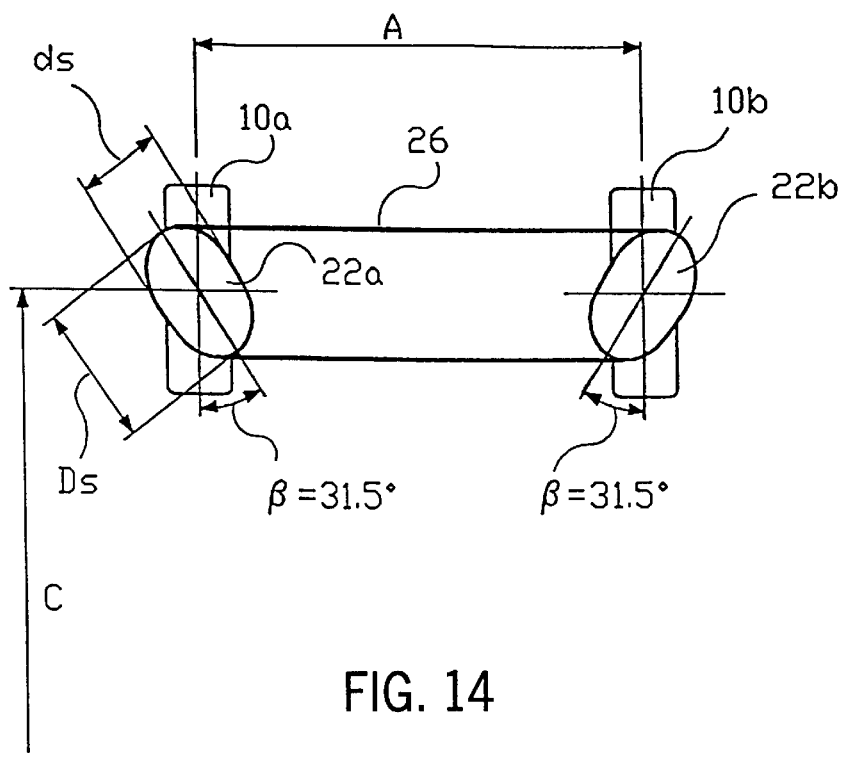
FIG. 14 shows the elliptical chain wheels/belt pulleys of the front wheels and their motion-transferring chain/belt on a larger scale, in order to emphasize the angle formed by the major axis of the ellipsis in relation to the associated front wheel's vertical center plane when the vehicle/carriage drives straight ahead/rearwardly.

In order to achieve that all wheels acquire one common turning point or centre 18 situated on a line 20 through the centre of the carriage (FIGS. 8, 9 and 12), circular chain wheels/belt pulleys have been mounted on each of the pairs 12*a/*12*b* and 12*c/*12*f* of intermediate wheels. Two chains/ belts 38*a* and 38*b* are mounted as crossed chains/belts on the intermediate wheels 12*a* through 12*e* and 12*b* through 12*f*. As shown in FIGS. 7, 8 and 9, fixed, non-turnable, rotary wheels 14*a* and 14*b* may be disposed with their centres on the line 20*c* of the turning point. In FIG. 12, elliptical wheels/pulleys 22*e* and 22*f* connected to the chain 26*a* have been dotted on the rear wheels 10*e* and 10*f*. It is especially when this interconnection of wheels/pulleys is used in a servocontrol arrangement, that the wheels/pulleys 22*a* and 22*f* as well as the chain 26*a* can be used. For servocontrol, the wheels or pulleys may have a smaller dimension than wheels or pulleys used for direct steering/guidance, see description of FIG. 24. Reference is made to FIG. 14 where test results associated to elliptical chain wheels/belt pulleys having mutually differing eccentricities or relationships between the major axis and the small axis Ds/ds are compared with the proportion between the previously defined centre distances C/A (A=centre distance between front wheels/steer wheels, C=distance between centre front wheels and centre rear wheels):

$$\frac{Ds}{ds} = \frac{240}{180} = 1,33 \text{ gives} \frac{C}{A} = \frac{1890}{471} = 4 \text{ (and when } \beta, \ 31, 50°) \quad 1)$$

$$\frac{Ds}{ds} = \frac{240}{153} = 1,57 \text{ gives} \frac{C}{A} = \frac{1560}{625} = 2,5 \text{ (and when } \beta, \ 31, 50°) \quad 2)$$

$$\frac{Ds}{ds} = \frac{240}{122} = 1,97 \text{ gives} \frac{C}{A} = \frac{800}{471} = 1,7 \text{ (and when } \beta, \ 31, 50°) \quad 3)$$

For 1), 2) and 3) apply that β is 31,50°.

Figure 15:
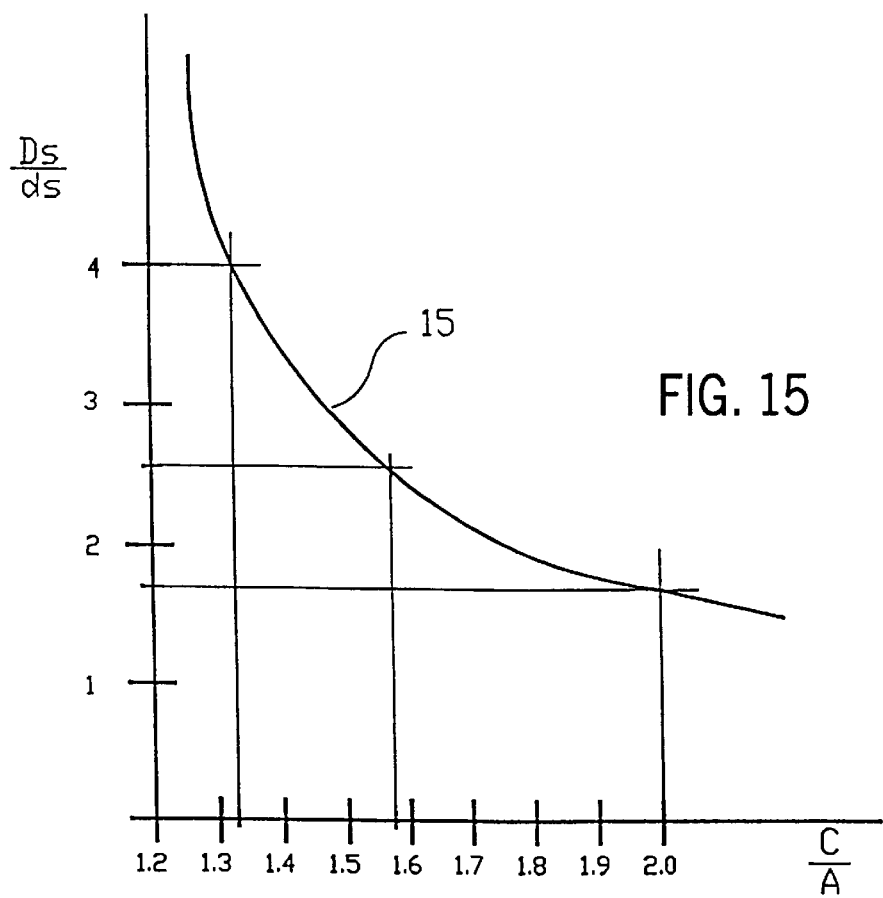
FIG. 15 is a graph in a right-angled system of co-ordinates in which varying proportions Ds/ds are placed along the ordinate and varying proportions C/A along the abscissa (C=distance between the centre line of the front wheels and the centre line of the rear wheels; A distance between the centre lines of the front wheels)

The graph according to FIG. 15 shows Ds/ds (ordinate) as a function of C/A (abscissa).

Figure 16:
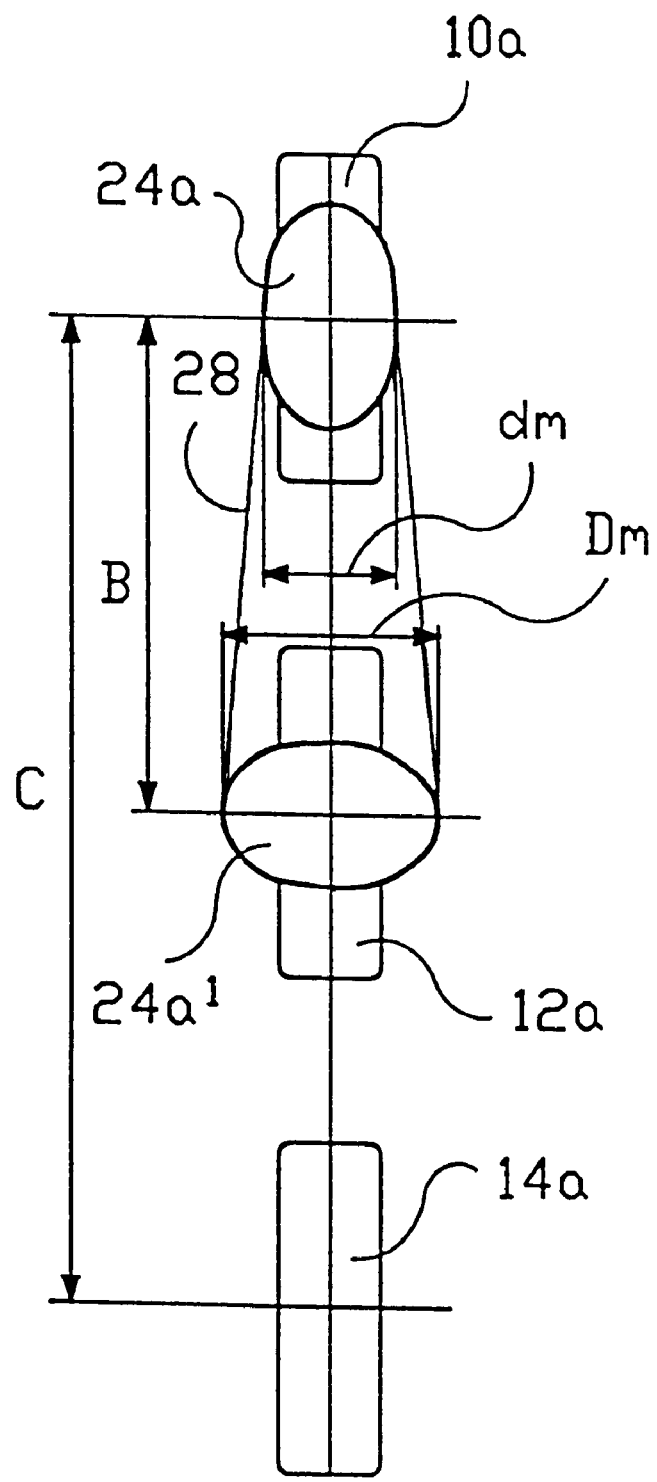
FIG. 16 shows, on a larger scale, one front wheel and the intermediate wheel at the same side, on each wheel an elliptical chain wheel/belt pulley has been mounted on each of the assigned vertical shafts.
Figure 17:
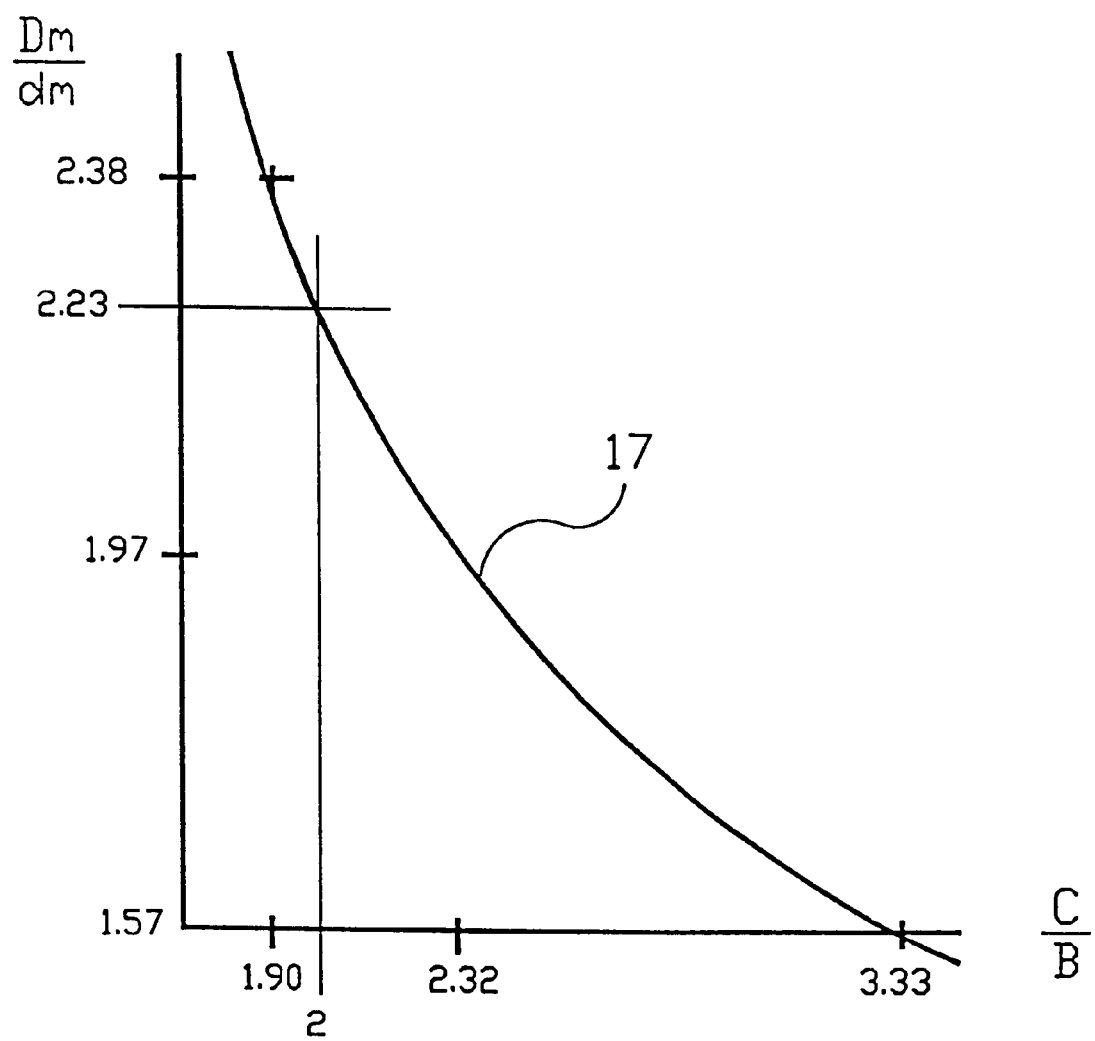
FIG. 17 is a graph where varying proportions Dm/dm are placed along the ordinate and varying proportions C/B (C=distance between the centre line of front wheels and centre line of rear wheels, B=distance between the centre line of front wheels and the centre line of intermediate wheels) placed along the abscissa.

FIGS. 16 and 17 illustrate test results associated with elliptical chain wheels/belt pulleys on steerable front wheels/inter-mediate wheels and shows relationships between proportions Dm/dm and C/B (or C1/B1 in FIG. 4 and C2/B2 in FIG. 7).

C is the distance between the centre of steerable front wheels perpendicularly to the centre line (20) through fixed rear wheels.

B is the distance between the centre of steerable front wheels and the centre of steerable intermediate wheels.

C1 is the distance between the centre of foremost steerable intermediate wheels and the centre line (20) through fixed rear wheels.

B1 is the distance between the centre of two steerable intermediate wheels at the same side of the carriage.

C2 is the distance between the centre of steerable rear heels and the centre line 20*c* through fixed wheels in the middle of the carriage.

B2 is the distance between the centre of steerable rear heels and the centre of closest positioned, steerable intermediate wheels.

$$\frac{Dm}{dm} = \frac{240}{153} = 1,57 \text{ when} \frac{C}{B} = \frac{2644}{794} = 3,33 \quad 1')$$

$$\frac{Dm}{dm} = \frac{240}{122} = 1,97 \text{ when} \frac{C}{B} = \frac{1844}{794} = 2,32 \quad 2')$$

$$\frac{Dm}{dm} = \frac{240}{101} = 2,38 \text{ when} \frac{C}{B} = \frac{1525}{803} = 1,90 \quad 3')$$

In FIG. 17, the proportion Dm/dm (ordinate) is charted as a function of the proportion C/B (abscissa).

Figure 18:
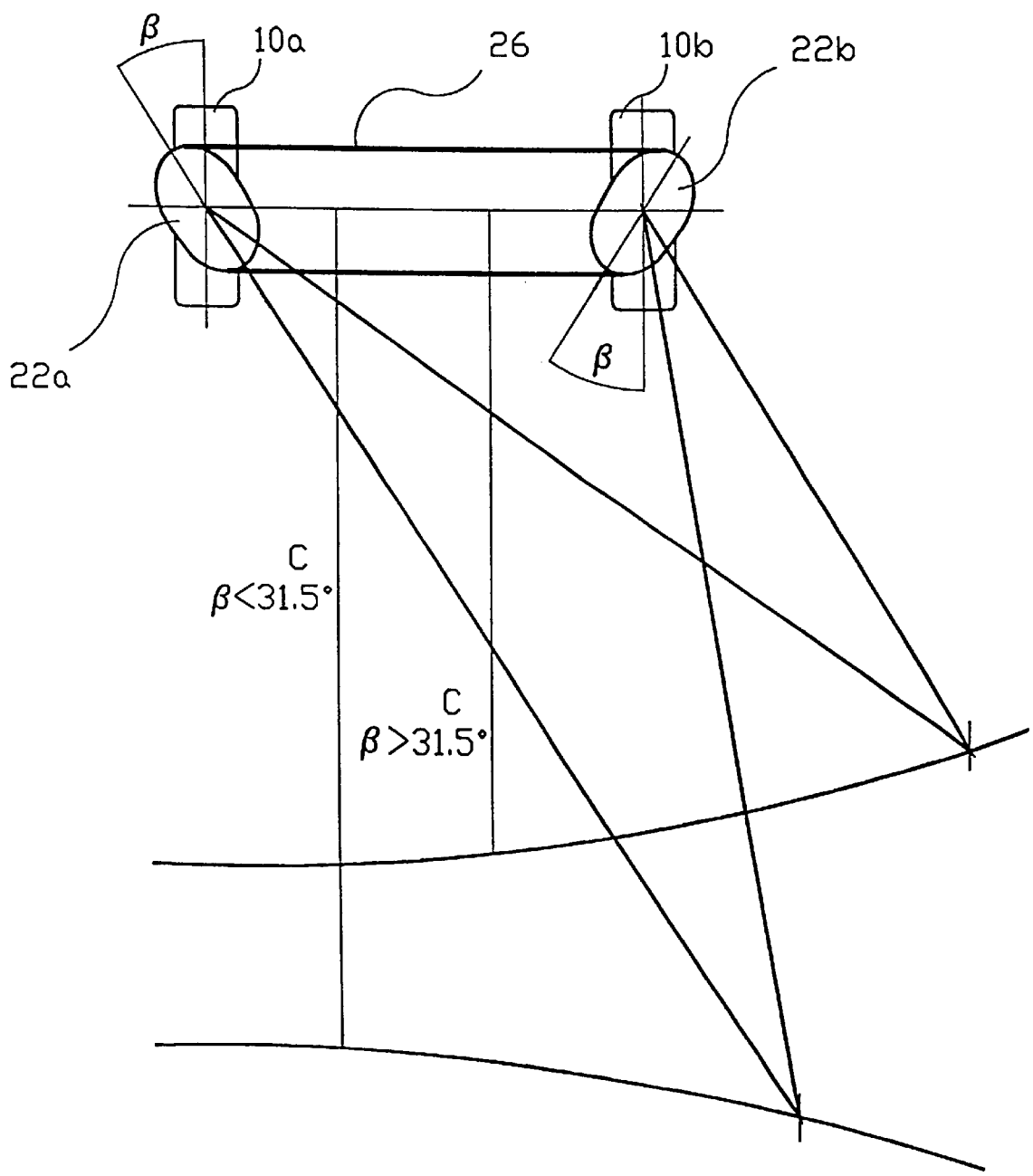
FIG. 18 indicates the influence of an angle β on distance C (FIGS. 1 and 10)

In FIG. 18 is illustrated the relationship between the angle β, see FIG. 14, and the distance C as well as the direction of intersecting lines for the centre lines of the wheels. Proposing that the angle β is less than 31,50°, C increases and the intersecting line turns outwardly. On the other hand, proposing that the angle β is larger than 31,50°, C decreases and the intersecting line turns inwardly, see FIGS. 14, 15 and 18.

FIGS. 19 to 22 show various automatic stretching devices for the chains/belts as compensation for a possible slackness of a chain/belt arisen due to change of the angular adjustment Z of the chain/belt at different steering angles. When driving straight ahead, and upon a turn of 90° to either side, there will always exist an angle Z×2 between chain/belt lengths, see FIG. 19. Upon making a turn of about 45° laterally, the chain/belt lengths will be approximately parallel, Z=0°, see FIG. 20. The angle Z will, upon driving straight ahead and 90° laterally, increase when the difference between Dm and dm increases. The angle Z will also increase when the distance B decreases.

This variation of the angle Z will induce a small slackness into the chain/belt lengths upon a turn of 45° when these lengths have a correct tensioning when driving straight ahead as well as upon turns of 90° laterally. When the angle Z is larger than about 2°, a compensating stretching device should be arranged which, upon a turn of 45°, automatically causes the same tensioning of the chain as when driving straight ahead and turning 90° laterally.

Figure 19:
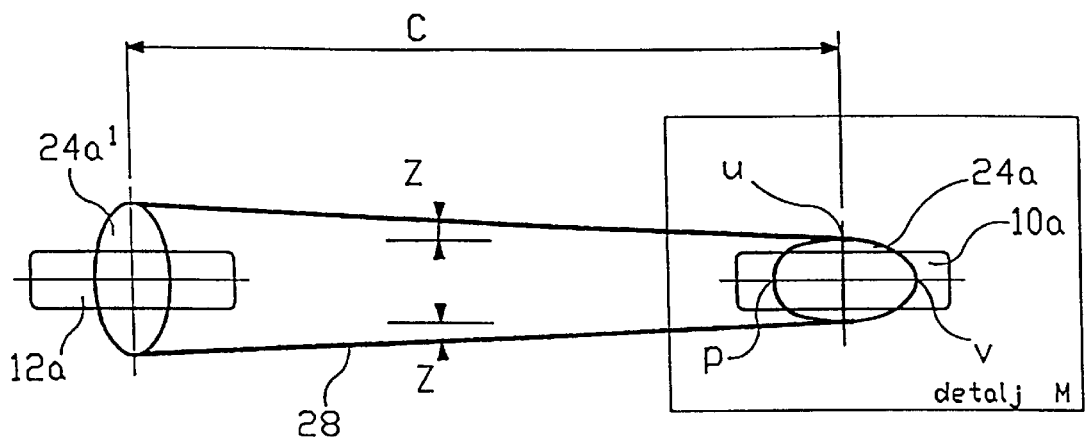
FIG. 19 shows an automatic stretching device for chains/belts between steer/guide wheel and intermediate wheel (or two intermediate wheels) upon adjusted elliptical shape (the wheels steer straight ahead/rearwardly)
Figure 19A:
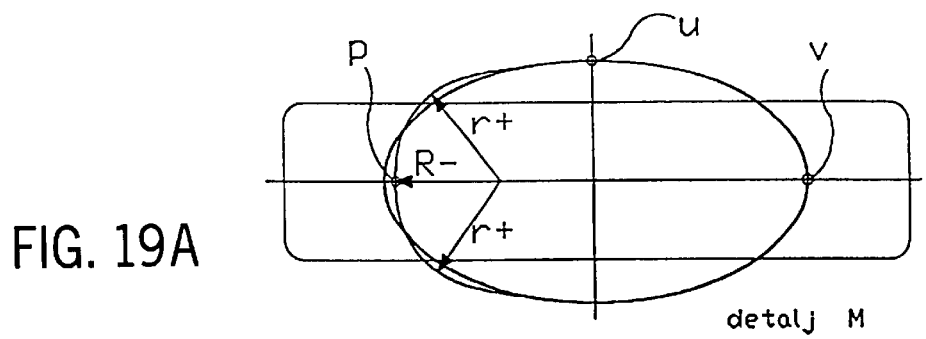
FIG. 19a shows the detailed portion of FIG. 19.
Figure 20:
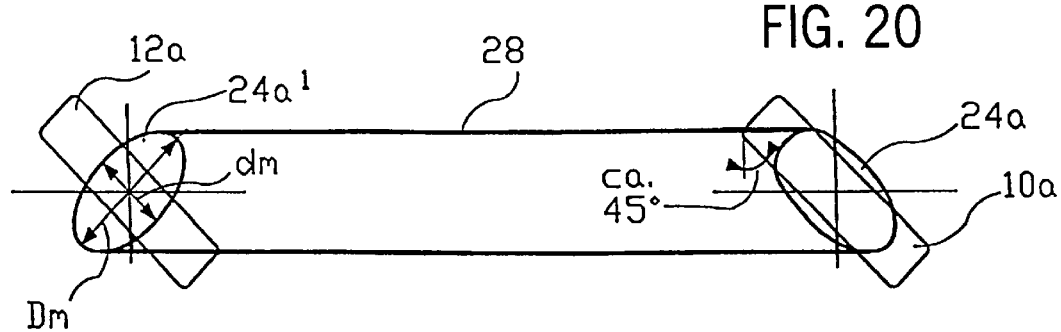
FIG. 20 shows the same stretching device as in FIG. 19, but disposed for steering about 45° to one of the sides.

FIGS. 19 and 20 shows a compensating device where the pulley 24*a* on the steer wheel is allotted an adjusted elliptical shape (extremely exaggerated in FIGS. 19 and 20). In order to achieve an even tensioning of the chain/belt, the length of the curved adjusted surface of the ellipsis from U to P must be equal to the length of the curved surface from U to V.

This adjustment of the shape of the ellipsis will theoretically reduce the accuracy of the steering angles. Practical tests show that this inaccuracy is hard to record, and the steering accuracy with an adjusted pulley will give a steering accuracy which is far better than steering by means of parallel struts.

Figure 21:
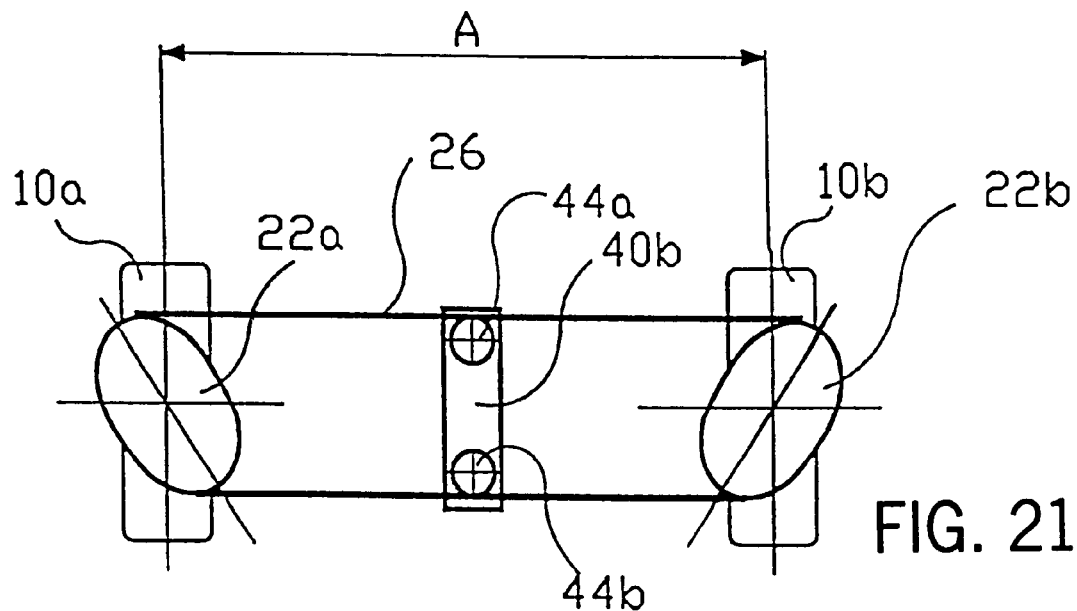
FIG. 21 shows an automatic stretching device for the chains or belts for steer wheels used for motion-transferring interconnection of certain "pairs" of elliptical chain wheels or belt pulleys, respectively.
Figure 22:
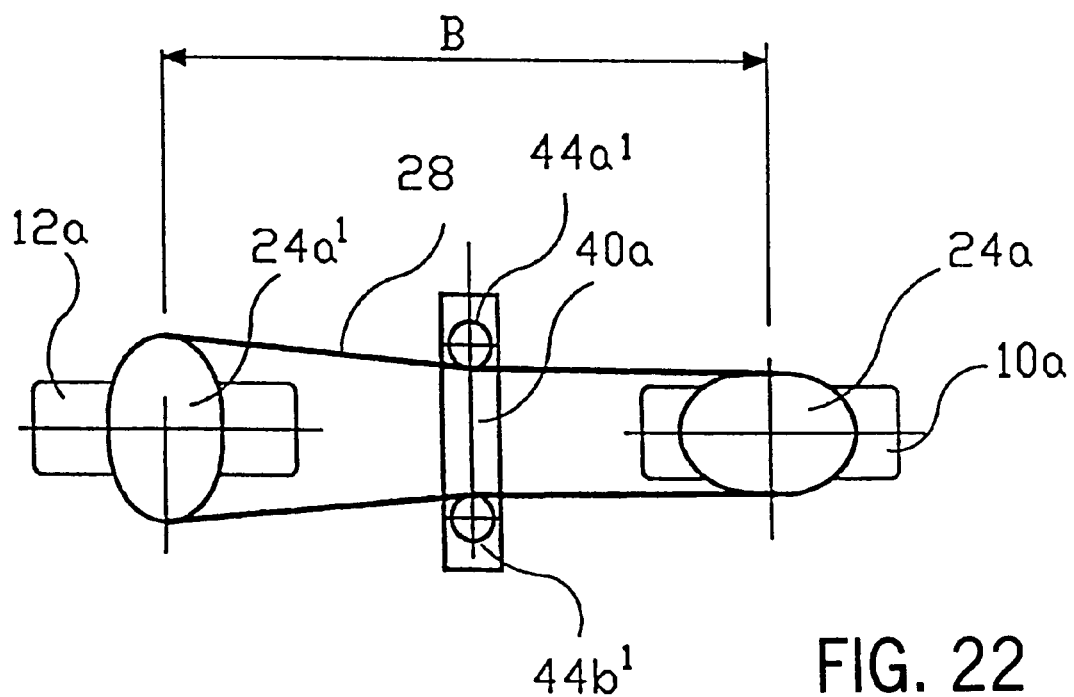
FIG. 22 shows an automatic stretching device for chains/belts between steer/guide wheel and intermediate wheel.

In FIG. 21 is shown a stretching device for the chain/belt 26 interconnecting the elliptical chain wheels/belt pulleys 22*a,* 22*b* of the front wheels 10*a,* 10*b*. The stretching device 40*b* comprises two small chain wheels/belt pulleys 44*a,* 44*b* having a fixed centre distance. According to FIG. 21, these stretching wheels 44*a,* 44*b* are disposed on the inside of the chain/belt 26, while corresponding stretching wheels 44*a'*, 44*b'* in FIG. 22 are disposed on the outside of the chain/belt 28 interconnecting the pulleys 24*a* and 24*a'* between steer wheel and intermediate wheel.

Figure 23:
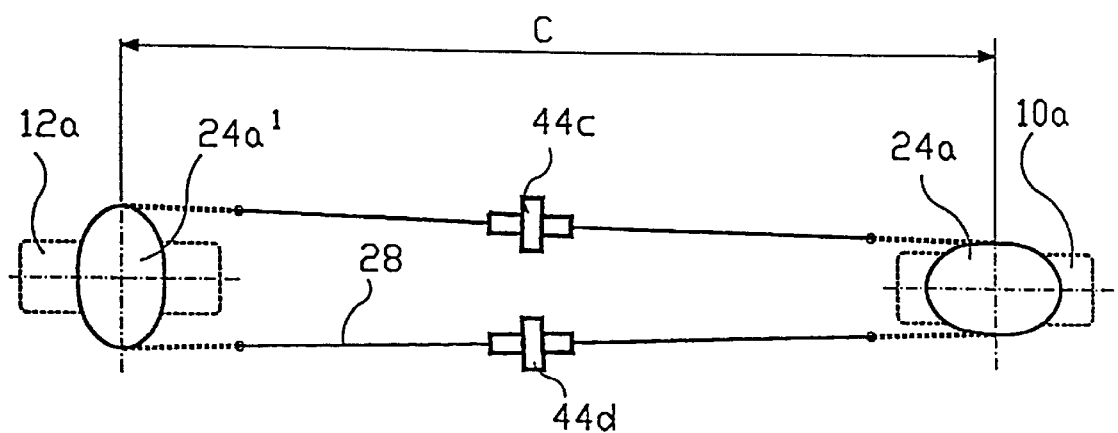
FIG. 23 shows a combined chain/belt stretching device also used to adjust wheel positioning.

FIG. 23 shows a combined chain/belt stretching device and adjusting device for wheel positioning. It is used independently of the automatic stretching/compensating device as shown in FIGS. 19 to 22.

Figure 24:
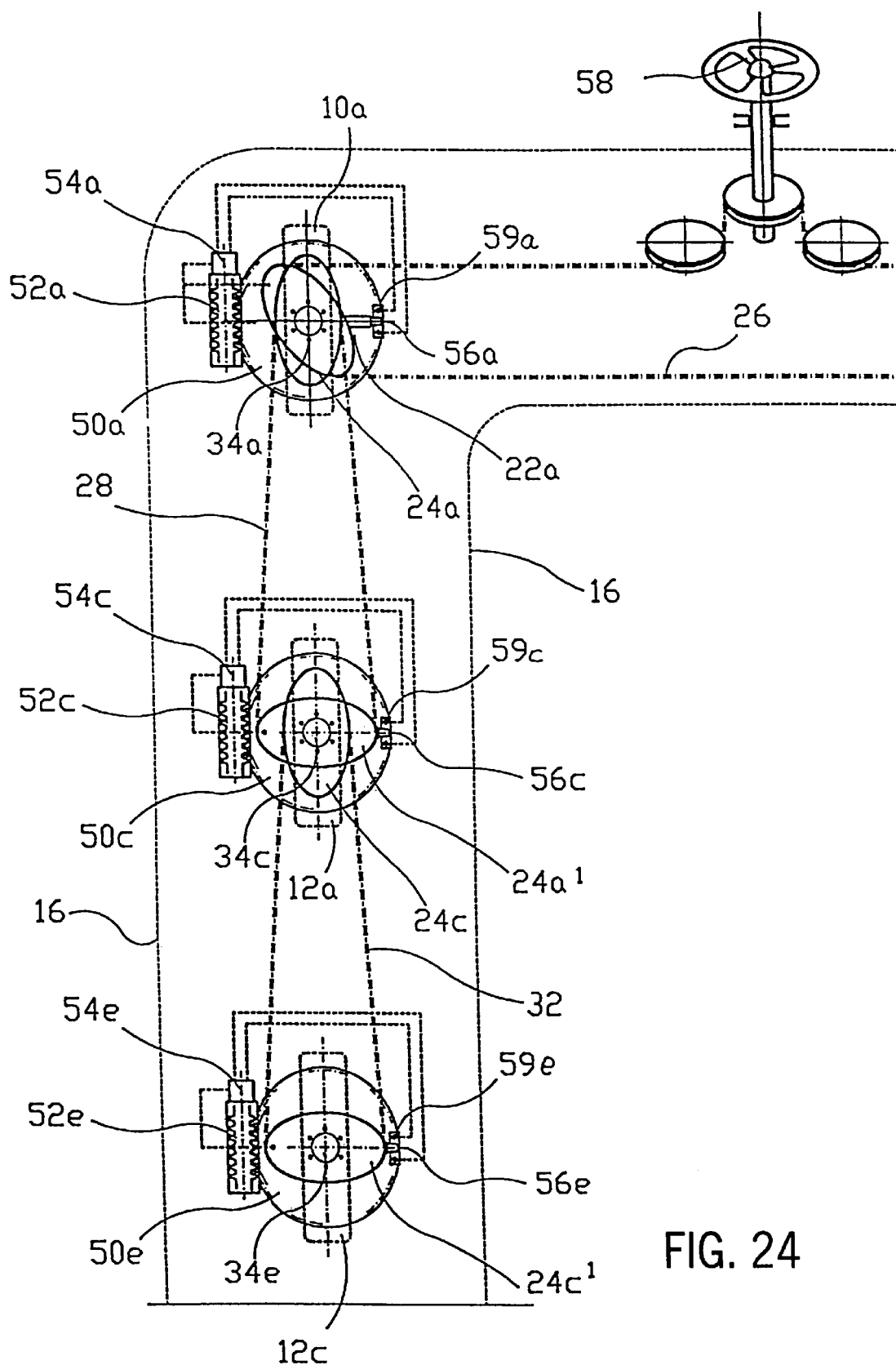
FIG. 24 shows in a detail view (a part of) a carriage having three steerable/guidable wheels at the left side. The sides of the carriage are shown in dotted lines. On each wheel is shown a turning activator attached to the turning shafts of the wheels. Elliptical chain wheels/belt pulleys are turned by means of a hand wheel through chain/belt. On the belt pulleys on each wheel is shown an activating arm of an electric/hydraulic switch controlling the turning activators.

In FIG. 24 is shown a coupling arrangement for servo-control of separate steering activator on each of the wheels on a carriage. In the figure is shown three steerable wheels on the left side of a carriage, a steer wheel 10a and two steerable intermediate wheels 12a and 12c. On each turning shaft 34a, 34c, 34e is mounted an individual turning activator consisting of: a worm wheel (alternative a large gear) 50a, 50c, 50e attached to the turning shaft, a worm screw 52a, 52c, 52e (alternative a small gear) for operating the worm wheel, and an electric (alternative hydraulic) motor 54a, 54c, 54e rotating the worm screw. Elliptical pulleys, one or two interconnected on each shaft 34a, 34c, 34e, can be freely turned on the shaft. Through the chains 26, 28 and 32, a manual steering wheel 58 can move the pulleys.

An activating arm 56a, 56c, 56e attached on the pulley unit of each turning shaft gives a pulse to an electric (hydraulic) switch (reverser, change-over switch) 59a, 59c, 59e in both rotational directions. The position of the manual steering wheel will always take a certain angular proportion to the steering direction of the carriage. A possible error (stop) in the turning arrangement of one of the steering wheels will stop the manual steering wheel 58, as well as stop the steering of the remaining wheels. In this case, the steering mechanism gives pulses to the activators only. The forces transferred through the chains/belts of the steering mechanism are small (manual from the steering wheel 58). Therefore, the parts of the steering mechanism can be made in small dimensions.

Again, reference is made to FIG. 10, showing actuators for transferring forces to the elliptical chain wheels/belt pulleys, namely in the form of at least one hydraulic piston cylinder 42a and/or 42b or another actuator for rectilinear transference of forces influencing at least one (e.g. 28 and/or 30) of the chains 26, 28, 30 directly. A large gear positioned in the turning centre of one of the wheels and driven through a small gear by means of an electric or hydraulic motor will also be usable.

Finally, reference is made to FIG. 12, where a point F has been marked on each pulley (elliptical and circular). On a vehicle as indicated in FIGS. 1 through 12, an area of the circumference of the elliptical (and circular) chain wheels/belt pulleys will always have contact with a certain area (point) on the chain/belt. In this case, the total turning angle is less than 180°. At this area (point) the chain/belt may be attached to the wheel/pulley (be clamped or attached through toggle screw). Then, pulleys without teeth can be used. The point F marked in FIG. 12 shows the positioning of this attachment point.

What is claimed is:

1. A steering mechanism for a wheeled vehicle, the vehicle having a generally longitudinal dimension and a generally transverse dimension normal to the longitudinal dimension, wheels of the vehicle rotating about respective rotation axes, said vehicle having at least four wheels pivotable about pivot axes oriented generally normal to the axes of rotation for steering the vehicle, said pivotable wheels being arranged in transversely spaced pairs, said pairs of wheels being longitudinally spaced along the vehicle, the wheels, and the rotational axes of the wheels, being parallel when the vehicle is in a condition to move straight forward or rearward, said pivotable wheels undergoing angular deflection about said pivot axes to steer the vehicle out of straight forward or rearward movement, the pivoting of the wheels through angular deflections being such that central lines, one of which extends through each of the rotational axes for the wheels, meet and intersect each other at a common point comprising a turning point for the vehicle, said steering mechanism comprising:

a turning shaft for each of said wheels, each of said turning shafts being journalled in said vehicle for movement about the pivot axis for the wheel;

a first disc-shaped power transmission means mounted on each of said turning shafts and presenting a periphery, each of said first power transmission means being elliptical in shape and having a major axis;

second power transmission means extending between and engaging said first power transmission means along at least a portion of the peripheries of said first power transmission means for linking the pivotal movement of one wheel in one of said pairs of wheels to the pivotal movement of the corresponding wheel in an adjacent pair of wheels; and each of said first power transmission means being mounted so that said major axes of said elliptical first power transmission means mounted on the turning shafts for the wheels of one pair of wheels lie at an angle to the major axes of said first power transmission means mounted on the turning shaft of the corresponding wheel in another pair of wheels when said vehicle is in a condition to move straight forward or rearward, the angles of said major axes of the first power transmission means with respect to each other controlling the relative angular deflection carried out by each of said pivotable wheels when said wheels are pivoted.

2. A steering mechanism as set forth in claim 1 wherein said vehicle also comprises a pair of non-pivotable wheels rotatable about a rotation axis extending normal to the longitudinal direction of said vehicle.

3. A steering mechanism as set forth in claim 2 wherein the turning point of the vehicle lies on the rotational axes of said non-pivotable wheels, wherein said vehicle has a front pair of pivotable wheels, a rear pair of non-pivotable wheels, and a pair of pivotable wheels intermediate said front and rear wheels, said steering mechanism further comprising:

a third disc shaped power transmission means mounted on the turning shaft of each of said wheels of said front pair of wheels, each of said third transmission means being elliptical in shape and having a major axis; and fourth power transmission means engaging said third power transmission means along at least a portion of the peripheries of said third power transmission means for linking the pivotable movement of one wheel of said front pair of wheels to the pivotable movement of the other wheel in said front pair of wheels.

4. A steering mechanism as set forth in claim 3 wherein the major axes of said third power transmission means converge with respect to each other in a direction towards the rear of said vehicle when the vehicle is in a condition to move straight forward or rearward, each of said major axes forming an acute angle β with a vertical central plane of the pivoted wheel mounted on the respective turning shaft.

5. A steering mechanism as set forth in claim 4 wherein said angle β is of the order of 27°–37°.

6. A steering mechanism as set forth in claim 5 wherein said angle β is approximately 31.50°.

7. A steering mechanism as set forth in claim 3 wherein said fourth power transmission means has portions extending between said third power transmission means; and wherein said steering mechanism includes a self-adjusting tensioning device for said fourth power transmission means.

8. A steering mechanism as set forth in claim 7 wherein said tensioning device comprises a pair of opposing wheels engaging portions of said fourth power transmission means.

9. A steering mechanism as set forth in claim 8 wherein said fourth power transmission means has a pair of portions extending between said third power transmission means and wherein said wheels engage inner sides of said portions.

10. A steering mechanism as set forth in claim 3 wherein each of said turning shafts has an individual turning actuator comprising a worm wheel coupled to a rotatable worm gear.

11. A steering mechanism as set forth in claim 10, wherein said first power transmission means are freely mounted on the turning shafts, said first, disc-shaped, elliptical power transmission means sliding axially on the worm wheels, wherein shaped, elliptical power transmission means sliding axially on the worm wheels, wherein a change-over switch is attached to each of said worm wheels, said switches being adapted for activation by said first power transmission means when said first power transmission means is operated by a manual steering wheel, said switches being adapted to activate motors for said worm gears.

12. A steering mechanism as set forth in claim 2 wherein said non-pivotable wheels are located at an end of the vehicle along said generally longitudinal dimension.

13. A steering mechanism as set forth in claim 2 wherein the vehicle has a non-pivotable pair of wheels centrally positioned along the longitudinal dimension of said vehicle and said pairs of pivotable wheels are located at the ends of said vehicle along said longitudinal dimension.

14. A steering mechanism according to claim 1 wherein said first power transmission means comprise chain wheels and said second transmission means comprises a chain.

15. A steering mechanism as set forth in claim 1 wherein said first power transmission means comprise pulleys and said second power transmission means comprises belts.

16. A steering mechanism as set forth in claim 1 wherein said pivotable wheels are pivotable through angles of at least 180° and wherein said first power transmission means comprise toothed pulleys, and wherein said second transmission means comprises toothed belts.

17. A steering mechanism as set forth in claim 1 wherein said pivotable wheels are pivotable through angles of less than 180° and wherein said first power transmission means comprise rope sheaves and wherein said second power transmission means comprises wire, said wire being attached to said rope sheaves at a point in each of said sheaves which is always in contact with said wire when said pivotable wheels undergo angular deflection.

18. A steering mechanism as set forth in claim 1 wherein said major axes of said first power transmission means mounted on the turning shaft of said wheels of a pair positioned in a central portion of the vehicle are aligned with each other and lie at an angle of 90° with the longitudinal dimension of the vehicle, and wherein the major axes of said first power transmission means mounted on the turning axis of each of said pivotable wheels of a pair of wheels mounted at an end of the vehicle are mutually parallel and lie parallel to the longitudinal dimension of the vehicle.

19. A steering mechanism as set forth in claim 1 for a vehicle having a distance A between the pivot axes of the wheels of a pair of wheels mounted at an end of the vehicle and a distance C from a line extending between said pivot axes for said end mounted pair of wheels to a line parallel thereto which, in any steering direction of the end mounted wheels, contains a common intersecting point of the center lines of the rotation axes of said wheels of said end mounted pair, said distance A and said distance C having a ratio value which is in a desired proportion to the ratio value between the major axis and a minor axis of said first elliptical power transmission means, each of said first elliptical power transmission means being of uniform shape and equal in size.

20. A steering mechanism as set forth in claim 19 wherein a distance B from the pivot axis of a wheel in said end mounted pair of wheels to the pivot axis of a wheel in an adjacent pair of pivotable wheels is in a certain proportion to the distance C, the value of distance C to distance B being in a desired ratio, which ratio is in a desired proportion to the ratio value between the major axis and the minor axis of the first elliptical power transmission means.

21. A steering mechanism as set forth in claim 1 wherein the vehicle has two pairs of pivotable wheels intermediate ends of the vehicle, wherein there is a distance $B_1$ between the pivot axes of the two pairs of pivotable wheels and a distance $C_1$ between the pivot axes of one of the pairs wheels and a line parallel thereto which, in any steering direction of end mounted wheels of said vehicle contain the common intersecting point of the pivoted wheels of the vehicle, said distance $C_1$ and said distance $B_1$ having a desired ratio which is in a desired proportion of the ratio value between a major axis and a minor axis of said first elliptical power transmission means.

22. A steering mechanism as set forth in claim 1 wherein said second power transmission means has portions extending between first disk-shaped power transmission means on adjacent wheels of said pairs of wheels; and wherein said steering mechanism includes self-adjusting tensioning devices for said second power transmission means.

23. A steering mechanism as set forth in claim 22 wherein said tensioning devices comprise pairs of opposing wheels engaging portions of said second power transmission means.

24. A steering mechanism as set forth in claim 23 wherein said second power transmission means has a pair of portions extending between said first power transmission means and wherein said opposing wheels engage outer sides of said portions.

25. A steering mechanism as set forth in claim 1 further including operating means comprising elongated actuators coupled to said second power transmission means for moving said second power transmission means.

26. A steering mechanism as set forth in claim 1 further including a plurality of first elliptical power transmission means mounted on said turning shafts, each of said plurality of first power transmission means having associated second power transmission means, said plurality of first elliptical power transmission means being shaped and designed to provide alternative steering angles.

* * * * *